United States Patent [19]

Brown

[11] 4,129,229

[45] Dec. 12, 1978

[54] ARTICLE DISPENSING APPARATUS

[75] Inventor: William L. Brown, Easton, Pa.

[73] Assignee: SI Handling Systems, Inc., Easton, Pa.

[21] Appl. No.: 763,785

[22] Filed: Jan. 31, 1977

[51] Int. Cl.² ............................................. B65B 47/02
[52] U.S. Cl. .................................. 221/129; 221/236; 198/435; 198/589
[58] Field of Search ................. 221/85, 129, 130, 131, 221/236, 150 R, 150 A, 150 HC, 191; 214/16.4 A, 16.1 CF; 198/594, 435, 589

[56] References Cited

U.S. PATENT DOCUMENTS

| 2,746,616 | 5/1956 | Sinclair | 214/16.1 CF |
|---|---|---|---|
| 2,813,661 | 11/1957 | Lazzereschi et al. | 222/63 |
| 3,294,282 | 12/1966 | Brown | 221/129 X |
| 3,348,732 | 10/1967 | Schwarz | 221/123 |
| 3,985,273 | 10/1976 | Davis | 222/326 |

Primary Examiner—Robert B. Reeves
Assistant Examiner—Fred A. Silverberg
Attorney, Agent, or Firm—Seidel, Gonda & Goldhammer

[57] ABSTRACT

An article dispensing apparatus is disclosed having a horizontally disposed conveyor mounted on a support for vertical movement so that the conveyor may receive articles from each of a plurality of superimposed storage shelves. A picking head for causing articles to be transferred from a shelf to the conveyor is mounted for vertical movement with the conveyor and is also supported for movement along the conveyor.

15 Claims, 4 Drawing Figures

ARTICLE DISPENSING APPARATUS

BACKGROUND

The apparatus of the present invention is an improvement over the apparatus disclosed in U.S. Pat. No. 3,348,732. In that patent, a picking head and receptacle are movable as a unit. Hence, it is impractical in the context of said patent to discharge items in the same order that they were picked off shelves.

SUMMARY OF THE INVENTION

The apparatus of the present invention includes a plurality of horizontally disposed shelves with dividers on each shelf thereby defining a plurality of lanes. A discrete pusher is associated with each lane for pushing articles toward the front edge of its associated shelf. A discrete actuator is provided for each pusher.

A conveyor is supported along a front edge of the shelves for receiving articles from said lanes. A motor means is provided for selectively elevating the conveyor so that it may receive articles from each of the shelves. A picking head is provided for controlling each pusher actuator. The picking head is supported for vertical movement with the conveyor for independent movement horizontally along the conveyor.

It is an object of the present invention to provide an article dispensing apparatus for automatically picking and dispensing articles from shelves with the conveyor for receiving and transporting the articles as they are picked whereby the articles may be packed or otherwise processed in the order in which they are picked.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
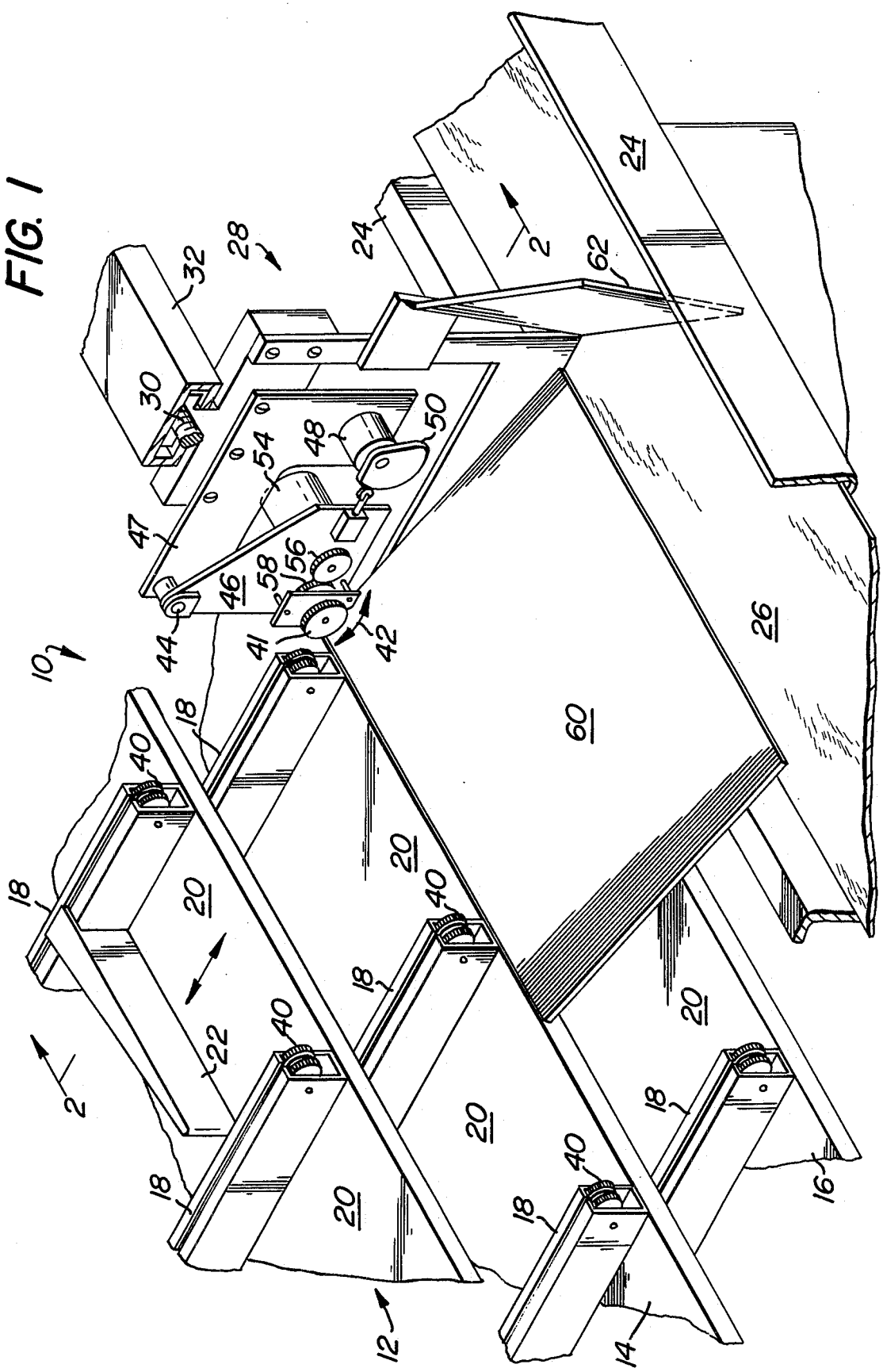
FIG. 1 is a partial perspective view of apparatus in accordance with the present invention.

Referring to the drawing in detail, wherein like numerals indicate like elements, there is shown in FIG. 1 apparatus in accordance with the present invention designated generally as 10. The apparatus 10 includes a housing 13 shown in part in FIG. 2 for supporting shelves which are disposed one above the other and horizontally arranged. In FIG. 1, there is illustrated a portion of shelves 12, 14 and 16 and the front edge thereof.

A plurality of dividers 18 are attached to each of the shelves 12-16 at spaced points therealong. Adjacent dividers 18 cooperate to define therebetween a lane 20. Articles to be dispensed are supported by the shelves in the lanes 20. A pusher 22 is provided for each lane and adapted to contact the last item in a lane and push the items forwardly so that the first item in a lane falls off the front edge of its associated shelf.

A frame 24 is provided in front of the shelves 12-16. The shelves 12-16 are of the same length. The frame 24 is of sufficient length so that an endless conveyor 26 supported thereby may receive articles from each lane 20 on each of the shelves 12-16. Hence, the endless conveyor 26 has a length which is at least as long as each of the shelves 12-16.

A picking head 28 is supported by the frame 24 for vertical movement therewith as the frame 24 and endless conveyor 26 move vertically to the elevation of the various shelves 12-16. Also, the picking head 28 is supported for horizontal movement along the conveyor 26 whereby the picking head 28 may be directed to each of the lanes 20 on each of the shelves 12-16. Any one of a variety of different mechanisms may be utilized to selectively cause the picking head 28 to move horizontally along the frame 24. As shown, the picking head 28 has a threaded nut coupled to a threaded shaft 30 and is quided for movement by a channel 32. Shaft 30 is preferably driven by a reversible pulse motor whereby a predetermined number of pulses will position the picking head 28 at preselected positions along the frame 24 so that it can be directed to any particular one of the lanes 20.

Frame 24 is guided for vertical movement at its ends and is adapted to be elevated in any convenient manner. As illustrated, vertically disposed threaded shafts 34 are coupled to the ends of the frame 24. A pulse motor 35 is provided for each of the shafts 34 so that the frame 24 may be moved vertically to preselected elevations whereby the picker head will be at a proper elevation with the conveyor 26 slightly below the elevation of the preselected shelf.

Figure 2:
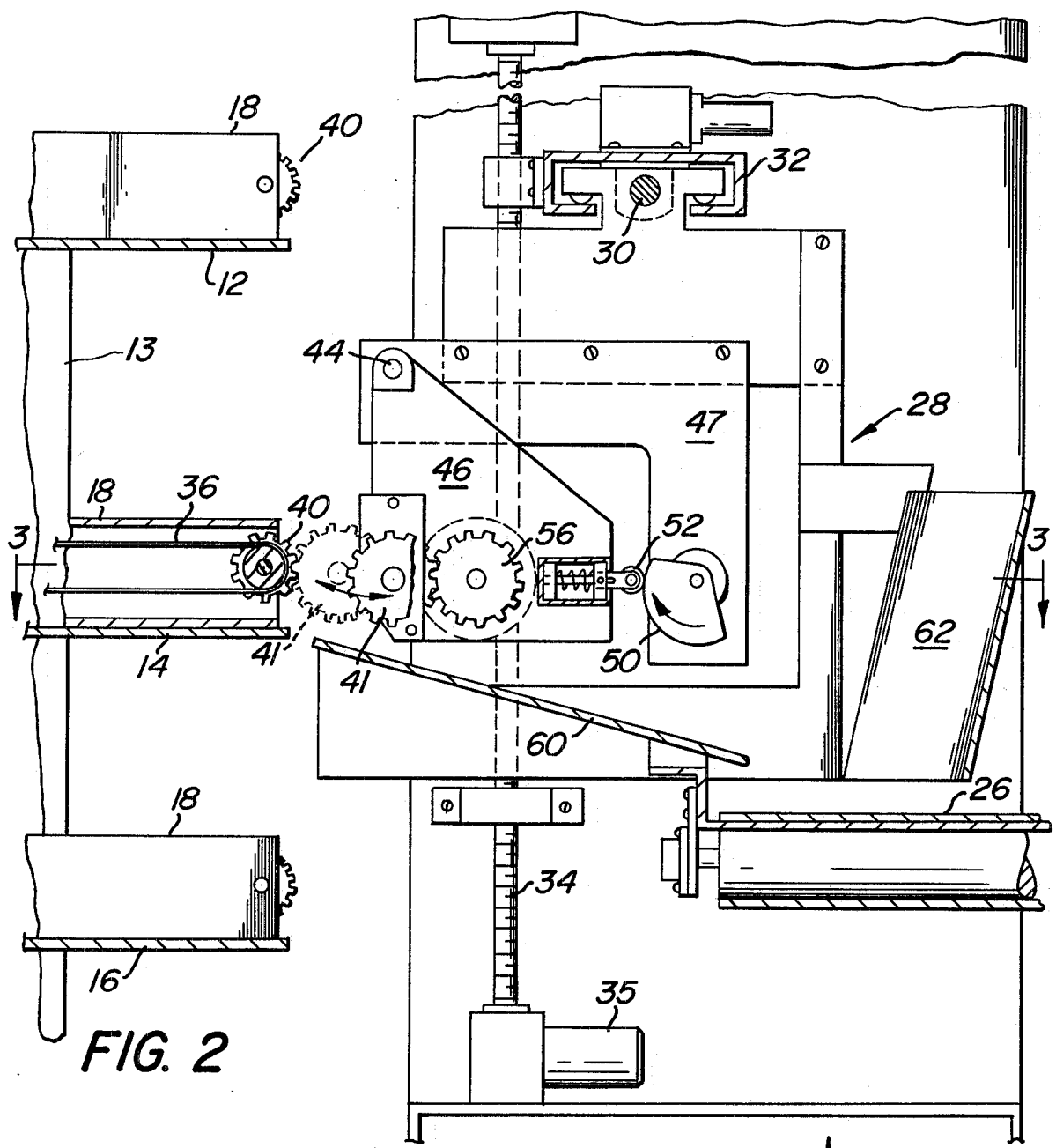
FIG. 2 is a sectional view taken along the line 2—2 in FIG. 1.
Figure 4:
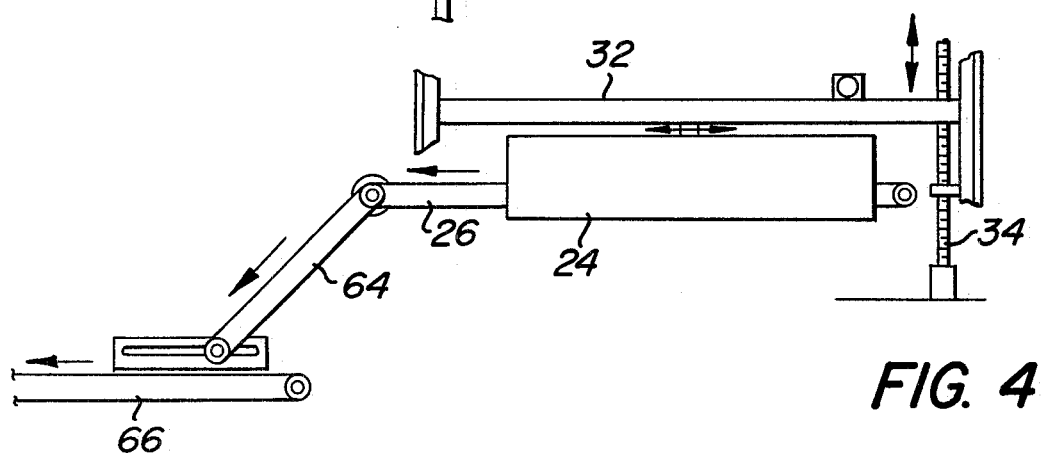
FIG. 4 is a diagrammatic elevation view of the apparatus.

The divider 18 on each of the shelves includes an actuator for causing the associated pusher 22 to move toward the front edge of the associated shelf. The actuator for the pushers may be in accordance with the teachings of U.S. Pat. No. 3,881,633. As illustrated in FIG. 2, each pusher 22 is connected to an endless cable 36. Cable 36 extends around gears 40 at each end of the divider 18. Each gear 40 projects beyond the front edge of its associated divider. That is, each gear 40 has an exposed portion as shown in FIGS. 1 and 2.

The picking head 28 has a gear 41 adapted to mesh with and drive gear 40 in a direction so as to cause the associated pusher 22 to move toward the front edge of the shelf. Gear 41 is supported by a plate 46. The plate 46 is supported from the picking head frame 47 by pin 44 whereby plate 46 and its associated gear 41 may pivot through an arc in the direction of arrow 42 toward and away from the gear 40.

Figure 3:
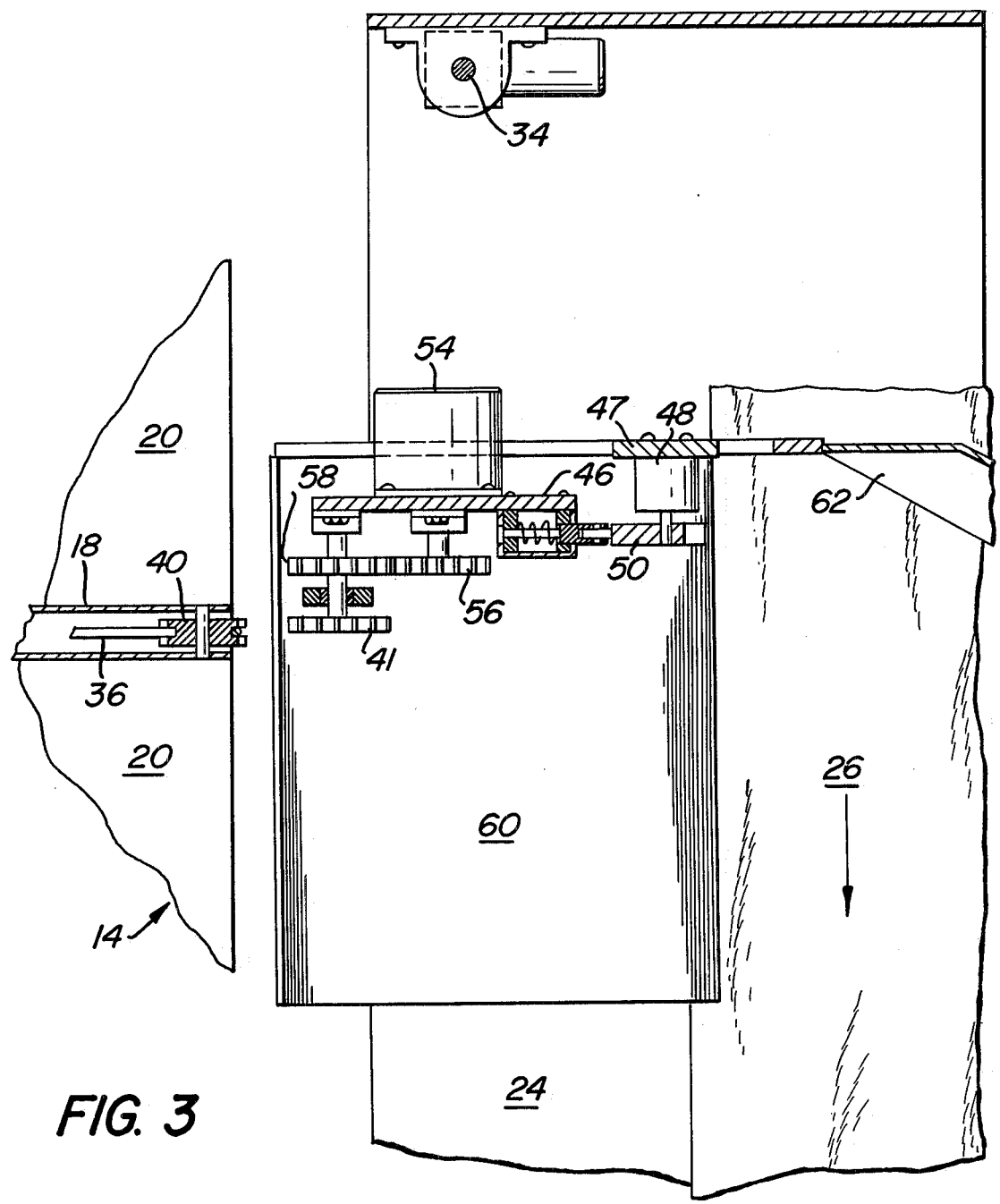
FIG. 3 is a sectional view taken along the line 3—3 in FIG. 2.

A rotary solenoid 48 is supported by the frame 47. A cam segment 50 is connected to the output of solenoid 48 and adapted to be caused to rotate in the direction of the arrow superimposed thereover in FIG. 2. A cam follower 52, spring biased into contact with cam 50, is supported by plate 46. As shown more clearly in FIG. 3, a motor 54 is supported by plate 46 for movement therewith. Motor 54 is a variable speed motor which drives gear 56 which in turn is meshed with gear 58. Gear 58 and gear 41 are pinned or otherwise secured to the same shaft.

The picking head frame 47 supports a sloping panel 60. The upper edge of panel 60 is at the elevation of shelf 14 while the lower edge of panel 60 is slightly above the elevation of the top run of conveyor 26. The upper and lower edges of the panel 60 are parallel to the front edge of the shelves 12-16. An angled back-up panel 62 is supported by the picking head frame 47 at a location spaced from the lower edge of the panel 60. The back-up panel 62 is angled with respect to a vertical plane containing the front edge of the shelves 12-16 and is tilted so as to slope toward the panel 60. See FIG. 1.

The lower edge of panels 60 and 62 define an acute angle of approximately 65 degrees.

The lefthand end of conveyor 26 is pivotally coupled to one end of an endless conveyor 64. The other end of endless conveyor 64 is coupled to and associated with a delivery conveyor 66. As articles are picked by the picking head 28, they are continuously and sequentially moved to a packing area by way of conveyors 26, 64 and 66 in the same order that they were picked. In this manner, checking of the articles against an invoice or list is more rapidly accomplished as compared with simultaneous delivery of all picked articles.

The apparatus is used as follows. Each of the lanes 20 is provided with articles to be dispensed. For example, one of the lanes 20 may contain a plurality of boxes of oatmeal disposed one behind the other. Another lane 20 would have articles such as cartons of cigarettes disposed one behind the other. Each lane 20 is identified.

Input instructions to cause the picking head to sequentially move to a predetermined position whereby its gear 41 will be opposite a gear 40 on a predetermined divider may be accomplished manually with teletype inputs, semi-automatically with a numerically punched system, or automatically with a computer hook-up. Picker head 28 may be moving horizontally along the length of the conveyor 26 while the entire frame 24 is being moved vertically by motor 35. When the gear 41 of the picking head 28 is opposite the preselected divider 18, solenoid 48 rotates cam 50 to pivot plate 46 about pin 44 until gear 41 meshes with gear 40. Gear 41 is driven by motor 54. Rotation of gear 40 moves the associated pusher 22 forwardly toward the front edge of its associated shelf. As soon as solenoid 48 is de-activated, plate 46 pivots to its normal position whereby gears 40 and 41 are spaced from one another. As soon as gear 41 is no longer meshed with gear 40, the pusher 22 stops.

The article pushed off the front edge of the shelf 14 slides down the panel 60 onto the conveyor belt of conveyor 26. If the article being dispensed is elongated, it will contact the panel 62 and the conveyor 26 will pivot the same whereby the long sides of the article will be parallel to the side edges of the conveyor 26. Conveyor 26 transports the articles in the order in which they are picked to conveyor 66 by way of conveyor 64. After one article is picked, and is being transported along conveyor 26, the picking head 28 is moved horizontally and/or vertically to the next lane from which it is desired to pick one or more articles.

If two or more articles are picked from a lane, and the articles are fragile such as glass bottles, breakage is minimized. Thus, the first bottle will be quickly moved by conveyor 26 before the second bottle is received on the conveyor 26. Hence, the apparatus 10 precludes damage which can occur when one glass bottle collides with another. The variable speed of motor 54 is used to attain a substantially constant picking speed even though some articles are small and others are large. Small articles are arranged in predetermined lanes. Whenever the picking head 28 is positioned opposite a small article lane, the voltage in the motor drive circuit is automatically decreased to slow down motor 54 so that pusher 22 moves slower as compared with its speed when dispensing large articles. Thus, a substantially uniform picking speed, i.e., number of articles per unit time, is attained.

Each of the dividers 18 is removably and adjustably connected to its associated shelf so that lanes 20 may be provided with different widths depending upon the size of the articles to be stored thereon. If the articles for a predetermined lane 20 are bars of soap, the adjacent dividers 18 may be only 4 inches from one another but will be spaced apart for a distance of about 10 inches in the next adjacent lane 20 if it is desired to have boxes of cereal therein. The panel 60 has a length which exceeds the widest of the lanes 20. Motor 54 drives gear 41 at all times. De-activation of the rotary solenoid 48 is preferably controlled by a photocell. Each article is counted as it leaves a particular lane 20 and after the required number of articles has been dispensed, the solenoid is deactivated.

The present invention may be embodied in other specific forms without departing from the spirit or essential attributes thereof and, accordingly, reference should be made to the appended claims, rather than to the foregoing specification as indicating the scope of the invention.

I claim:

1. Apparatus comprising:
   (a) means supporting a plurality of horizontally disposed shelves one above the other, means dividing said shelves into a plurality of lanes,
   (b) a discrete pusher associated with each lane for pushing articles toward the front edge of its associated shelf, a separate actuator for each pusher,
   (c) a conveyor along the front edge of said shelves for receiving goods from said lanes, motor means for selectively elevating said conveyor so that it may receive goods from each of said shelves,
   (d) a picking head for controlling each pusher actuator, said picking head being supported for vertical movement with said conveyor and for independent movement horizontally along said conveyor, said picking head being supported above the elevation of said conveyor and having a sloping member movable therewith for receiving articles from a shelf lane and transferring the same to said conveyor.

2. Apparatus in accordance with claim 1 wherein said conveyor is an endless conveyor having a length approximately equal to the length of the front edge of the shelves.

3. Apparatus in accordance with claim 1 including an angularly disposed back-up panel above the elevation of the conveyor and spaced from the lower edge of the sloping member, said back-up panel being movable with the picking head.

4. Apparatus in accordance with claim 1 wherein the picking head supports a gear for movement toward and away from a vertical plane containing the front edge of said shelves for driving any preselected one of said pusher actuators.

5. Apparatus in accordance with claim 4 wherein said picking head gear is supported for pivotable movement about an axis which is horizontally disposed, and cam means for selectively shifting said gear toward said plane.

6. Apparatus in accordance with claim 1 wherein said conveyor is an endless conveyor having one end pivotably coupled to another endless conveyor.

7. Apparatus comprising a plurality of shelves disposed at different elevations, means dividing said shelves into a plurality of lanes, a first endless conveyor, motor means coupled to a frame supporting said first endless conveyor for causing vertical movement of the frame so that said conveyor is positionable for receiving goods from the lanes on each of said shelves, a picking head on said conveyor frame for vertical movement with said first conveyor and supported for independent movement generally parallel to the front edge of said shelves, said picking head being supported above the elevation of said conveyor, means on said picking head movable toward and away from a vertical plane containing a front edge of said shelves for contact with means on the shelf to cause the ladder to move an article off the shelf onto said conveyor, said first conveyor having a length approximately equal to the length of said shelves, and a second endless conveyor having one end pivoted to one end of said first conveyor for receiving articles therefrom.

8. Apparatus in accordance with claim 7 wherein said picking head means is supported by the picking head for pivotable movement toward and away from said plane.

9. Apparatus in accordance with claim 8 including a sloping panel movable with said picking head for transferring articles from a shelf lane to said conveyor.

10. Apparatus in accordance with claim 7 wherein said picking head means is a gear supported by said picking head, cam means on said picking head for selectively moving said gear toward said plane.

11. Apparatus in accordance with claim 7 wherein said means on the shelf for moving an article off the shelf onto said conveyor includes a pusher projecting into the lane and mounted for movement along the lane toward and away from said front edge of the shelves, each lane having a discrete pusher selectively movable by said picking head.

12. Apparatus comprising:
(a) means supporting a plurality of horizontally disposed shelves one above the other, means dividing said shelves into a plurality of lanes,
(b) a discrete pusher associated with each lane for pushing articles toward the front edge of its associated shelf, a separate actuator for each pusher,
(c) a conveyor along the front edge of said shelves for receiving goods from said lanes, motor means for selectively elevating said conveyor so that it may receive goods from each of said shelves, said conveyor being an endless conveyor having a length approximately equal to the length of the front edge of the shelves,
(d) a picking head for controlling each pusher actuator, said picking head being supported for vertical movement with said conveyor and for independent movement horizontally along said conveyor, said picking head being supported above the elevation of said conveyor and having a sloping member movable therewith for receiving articles from a shelf lane and transferring the same to said conveyor, the picking head supporting a gear for movement toward and away from a vertical plane containing the front edge of said shelves for driving any preselected one of said pusher actuators, said picking head gear being supported for pivotable movement about an axis which is horizontally disposed, and cam means for selectively shifting said gear toward said plane.

13. Apparatus in accordance with claim 12 including an angularly disposed back-up panel above the elevation of the conveyor and spaced from the lower edge of the sloping member, said back-up panel being movable with the picking head.

14. Apparatus in accordance with claim 12 wherein said endless conveyor has one end pivotably coupled to one end of another endless conveyor in series therewith for receiving articles from the first mentioned conveyor at all elevations thereof.

15. Apparatus comprising a plurality of shelves disposed at different elevations, means dividing said shelves into a plurality of lanes, an endless conveyor having a length substantially equal to the length of said shelves, motor means coupled to a frame supporting said endless conveyor for causing vertical movement of the frame so that said conveyor may receive goods from the lanes on each of said shelves, a picking head supported on said conveyor frame for vertical movement with said conveyor and supported for independent movement relative to said frame in a direction generally parallel to the front edge of said shelves, said picking head being supported above the elevation of said conveyor, said picking head including means for controlling a shelf supported discharge device capable of moving an article off a shelf onto said conveyor, a drive motor for said picking head, said drive motor being supported by said conveyor frame, said drive motor being a variable speed motor.

* * * * *